(12) United States Patent
Yoshimura et al.

(10) Patent No.: US 7,462,050 B2
(45) Date of Patent: Dec. 9, 2008

(54) ROTARY CONNECTOR

(75) Inventors: Kenji Yoshimura, Tokyo (JP); Hiromi Ishiyama, Tokyo (JP); Noritsugu Enomoto, Tokyo (JP); Toshio Kitaoka, Toyota (JP); Shigeo Nakamura, Aichi-ken (JP); Yoshihiro Natsuda, Aichi-ken (JP)

(73) Assignees: The Furukawa Electric Co., Ltd., Tokyo (JP); Toyota Jidosha Kabushiki Kaisha, Toyota-shi (JP); Kabushiki Kaisha Tokai Rika Denki Seisakusho, Niwa-gun (JP)

( * ) Notice: Subject to any disclaimer, the term of this patent is extended or adjusted under 35 U.S.C. 154(b) by 0 days.

(21) Appl. No.: 11/756,165

(22) Filed: May 31, 2007

(65) Prior Publication Data

US 2008/0014775 A1      Jan. 17, 2008

(30) Foreign Application Priority Data

Jun. 1, 2006     (JP) .............................. 2006-153376

(51) Int. Cl.
H01R 35/04     (2006.01)
(52) U.S. Cl. .................. 439/164; 439/491; 439/910
(58) Field of Classification Search .................. 439/15, 439/164, 488, 491, 910
See application file for complete search history.

(56) References Cited

U.S. PATENT DOCUMENTS

| 4,820,193 | A | * | 4/1989 | Noorily ...................... 439/488 |
| 5,314,344 | A | * | 5/1994 | Ida et al. ..................... 439/164 |
| 6,471,529 | B2 | * | 10/2002 | Oishi ........................ 439/164 |
| 6,688,898 | B2 | | 2/2004 | Nisimoto et al. |
| 2003/0129867 | A1 | | 7/2003 | Adachi et al. |
| 2004/0209504 | A1 | * | 10/2004 | Wade et al. ................. 439/164 |

FOREIGN PATENT DOCUMENTS

| JP | 2003-197339 | 7/2003 |
| JP | 2004-104899 | 4/2004 |
| JP | 2004-222369 | 8/2004 |
| JP | 2006-32324 | 2/2006 |

* cited by examiner

*Primary Examiner*—Tho D Ta
(74) *Attorney, Agent, or Firm*—Oblon, Spivak, McClelland, Maier & Neustadt, P.C.

(57) ABSTRACT

Any one of the reversing portions of the flat cables is positioned in the sighting window when the inner case is in the neutral state. A prescribed mark is attached to the reversing portion which is positioned in the sighting window when the inner case is in the neutral state. Thus, it can be determined that the inner case is in the neutral state when the prescribed mark is attached to the reversing portion sighted through the sighting window.

5 Claims, 6 Drawing Sheets

ROTARY CONNECTOR

BACKGROUND OF THE INVENTION

1. Technical Field

The present invention relates to a rotary connector used for transmitting an electric signal, optical signal, electric power or the like between a rotary body and a fixed body.

2. Related Arts

A rotary connector is used for electrically connecting a rotary body to a fixed body supporting the rotary body. For example, the rotary connector is used for transmitting an electric signal from the vehicle body to an air bag system or the like mounted in the steering of the car. The rotary connector applied to the car includes an outer case and an inner case which is installed within the outer case in rotatable manner relative to the outer case. A cable housing is formed by thus installed outer case and inner case, and flat cables are received within the cable housing.

The outer case has a bottom portion and an outer cylindrical portion, and the inner case has an upper lid portion and an inner cylindrical portion. The inner case rotates within the outer cylindrical portion of the outer case. In addition, a fixed connecting portion is provided with the outer case, and a rotary connecting portion is provided with the inner case. After one end of the flat cable is connected to the fixed connecting portion, the flat cable received in the cable housing is wound along an inner wall of the outer cylindrical portion in one direction. A winding direction of the flat cable is reversed at a reversing portion, and then the flat cable is wound along an outer wall of the inner cylindrical portion. The other end of the flat cable is connected to the rotary connecting portion. Furthermore, there are proposed that the flat cable is wound within the cable housing in one direction, and that the reversing portion is formed by a roller.

It is required that the inner case is set to be in such a rotational position that the number of possible clockwise rotations of the inner case is the same as the number of possible counterclockwise rotations of the inner case, when the rotary connector is attached to the vehicle body. The above described state is hereunder called as the neutral state.

A fixing tool is arranged to fix the inner case to the outer case in the rotary connector, and the inner case is provisionally fixed by the fixing tool so that the neutral state is maintained until the rotary connector is attached to the vehicle body.

There is proposed that an aligning mark is provided at the respective appropriate locations of the outer case and the inner case so as accurately return to the neutral state of the inner case after removing the fixing tool.

However, the above described marks match even in the situation that the inner case rotates one time. Accordingly, in case that the inner case largely rotates after the fixing tool is removed, the inner case is hardly returned to be in the neutral state.

In particular, when the rotary connector is detached from the vehicle body for repairing after being attached thereto, it is necessary that the inner case is returned to be in the neutral state before being attached again to the vehicle body. Since the inner case is not provisionally fixed by the fixing tool in this case, the inner case is hardly returned to be in the neutral state.

In order to solve the above described problems, Japanese Patent Application Publication No. 2004-222369 discloses that in addition to the aligning mark, a sighting window is provided with the inner case to be able to sight the reversing portion of the flat cable when the inner case is in the neutral state.

The reversing portion moves in a circumferential direction within the cable housing together with the rotation of the inner case. The sighting window is provided at such a location that the reversing portion can be sighted through the sighting window in the neutral state of the inner case. Accordingly, the reversing portion can be sighted through the sighting window only when the inner case is in the neutral state. In other words, the reversing portion cannot be sighted through the sighting window when the inner case is largely deviated from the neutral state.

Furthermore, when more than two flat cables are received in the cable housing, the reversing portion of other flat cable is sighted through the sighting window even when the inner case is not in the neutral state, thus falsely recognizing the situation as the neutral state of the inner case.

Japanese Patent Application Publication No. 2004-222369 also discloses that the aligning marks are largely misaligned when the reversing portion of other flat cable is sighted through the sighting window at the time that the inner case is not in the neutral state. Thus it can be determined that the inner case is in the neutral state when the aligning marks are matched and at the same time the reversing portion of the flat cable can be sighted through the sighting window.

However, a means for recognizing the neutral state of the inner case disclosed in Japanese Patent Application Publication No. 2004-222369 requires to recognize whether the reversing portion of the flat cable can be sighted or not through the sighting window while the aligning marks are caused to be matched, thus it possibly takes time to lead the inner case to be in the neutral state. Furthermore, both of the aligning of the marks and the sighting of the reversing portion have to be performed at the same time, thus being bothersome works.

In addition, in the rotary connector disclosed in Japanese Patent Application Publication No. 2004-222369, it has to be designed in such manner that both of the aligning of the marks and the sighting of the reversing portion are performed at the same time when the inner case is in the neutral state, and on the other hand, the aligning of the marks and the sighting of the reversing portion are not performed at the same time, when the inner case is not in the neutral state, thus the manufacturing process of the rotary connector becomes complex.

The present invention has been made to solve the above described problems in the prior arts, and aims to provide a rotary connector in which the neutral state of the inner case can be easily recognized regardless of the number of the flat cables.

SUMMARY OF THE INVENTION

One of the embodiments of the rotary connector of the invention comprises: an outer case having a bottom portion and an outer cylindrical portion; an inner case having an upper lid portion and an inner cylindrical portion, installed within said outer case in relatively rotatable manner to said outer case; at least one flat cable received in a cable housing formed by said outer case and said inner case; a fixed connecting portion provided in said outer case, to which one end of the flat cable is connected; a rotary connecting portion provided in said inner case, to which other end of the flat cable is connected; a reversing portion provided in the cable housing for reversing a winding direction of the flat cable from a state being wound along an inner wall of said outer cylindrical portion in one direction with one end of said flat cable connected to said fixed connecting portion, to a state being wound along an outer wall of said inner cylindrical portion with other end of said flat cable connected to said rotary connecting portion; a prescribed mark attached to a portion of the flat cable corresponding to the reversing portion when the inner case is in a neutral state in which number of clockwise rotations of the inner case is equal to number of counterclockwise rotations of the inner case; and a sighting window arranged in the upper lid portion for sighting the mark in the neutral state.

In one of the other embodiments of the rotary connector, at least two flat cables are received in the cable housing, and the prescribed mark is attached only to the reversing portion sighted through the sighting window in the respective reversing portions of the flat cables when the inner case is in the neutral state.

In one of the other embodiments of the rotary connector, at least two flat cables are received in the cable housing, the prescribed mark is attached to the reversing portion sighted through the sighting window in the flat cable when the inner case is in the neutral state, and a different mark from the prescribed mark is attached to the reversing portion sighted through the sighting window in the cable when the inner case is not in the neutral state.

In one of the other embodiments of the rotary connector, the prescribed mark is formed to be a configuration corresponding to a window frame of the sighting window when the inner case is in the neutral state.

In one of the other embodiments of the rotary connector, the prescribed mark is formed to be a configuration corresponding to a prescribed location in the sighting window when the inner case is in the neutral state.

In one of the other embodiments of the rotary connector, the prescribed mark is colored by a high recognition color such as red, yellow or the like.

In one of the other embodiments of the rotary connector, the different mark is formed by a different configuration or colored by a different color in respective reversing portions sighted through the sighting window.

BRIEF DESCRIPTION OF THE DRAWINGS

FIG. 2(*a*) to 2(*e*) shows five examples of the prescribed mark;

DETAILED DESCRIPTION OF THE INVENTION

The embodiments of the rotary connector of the present invention are described with reference to the accompanying drawings.

Figure 1:
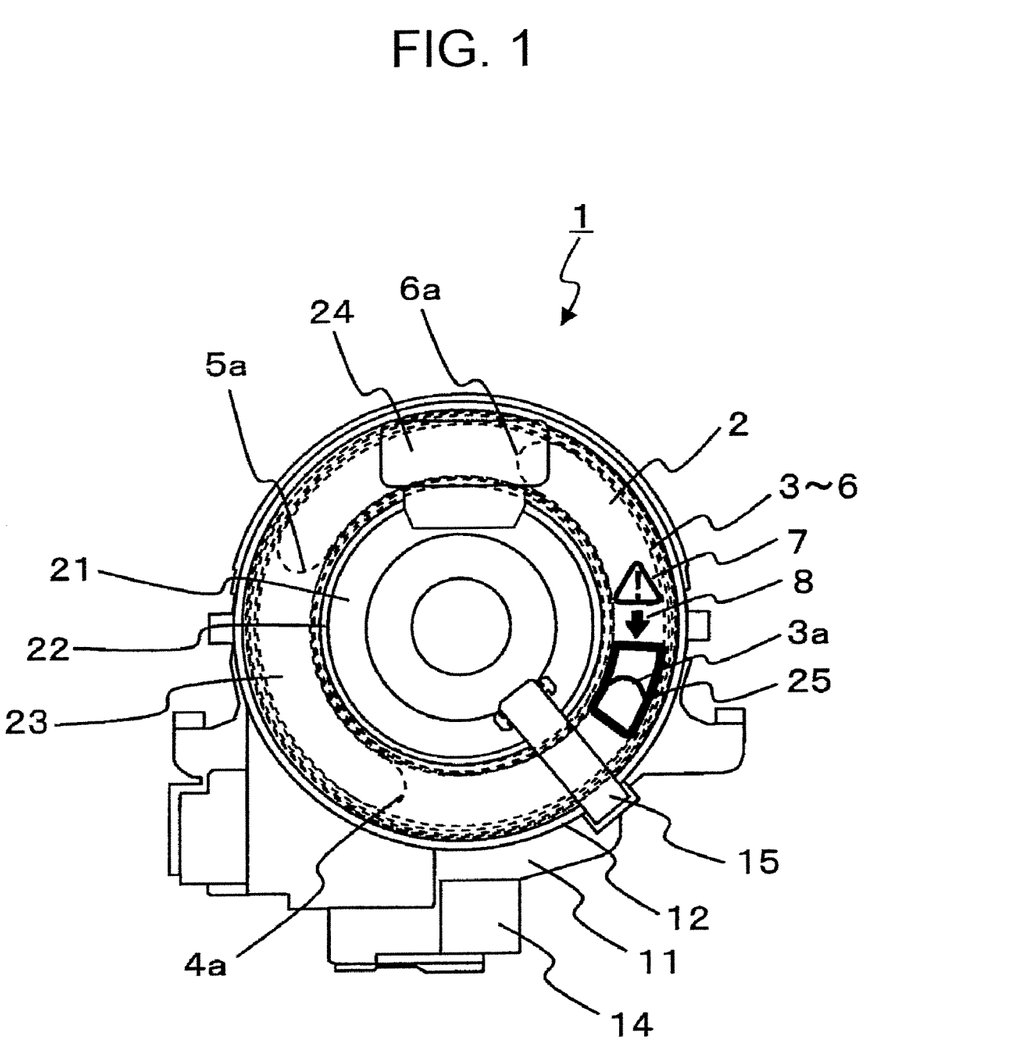
FIG. 1 is a plan view showing a schematic constituent of the first embodiment of the rotary connector of the invention.

FIG. 1 is a plan view showing a schematic structure of the first embodiment of the rotary connector of the invention.

In the rotary connector 1 of the first embodiment of the invention as shown in FIG. 1, a cable housing 2 is formed by an outer case 11 and an inner case 21, in which flat cables 3 to 6 are received. The inner case 21 is installed within an outer cylindrical portion 12 of the outer case 11 in such manner that the inner case can freely rotate in both directions of clockwise and counterclockwise.

Although four flat cables 3 to 6 are received in the cable housing 2 in the embodiment as shown in FIG. 1, the number of the flat cables received in the cable housing 2 is not necessarily four, i.e., more or less number of flat cables may be applied.

The outer case 11 includes a cylinder-shaped outer cylindrical portion, a bottom portion 13 (not shown), and a fixed connecting portion 14. The inner case 21 includes a cylinder-shaped inner cylindrical portion 22, an upper lid portion 23, and a rotary connecting portion 24. The cable housing 2 has an annular space formed by the outer cylindrical portion 12 and the bottom portion 13 of the outer case 11, and the inner cylindrical portion 22 and the upper lid portion 23 of the inner case 21.

Respective one ends of the flat cables 3 to 6 received in the cable housing 2 are electrically connected to the fixed connecting portion 14 provided in the outer case 11, and respective other ends thereof are electrically connected to the rotary connecting portion 24 provided in the inner case 21. Electrical signals can be sent from the vehicle body through the rotary connector 1 to an air bag or the like mounted in the steering.

The flat cables 3 to 6 electrically connected to the fixed connecting portion 14 are guided into the cable housing 2, and wound in one direction (i.e., counterclockwise in FIG. 1) along the outer cylindrical portion 12 in a spiral manner. Reversing portions 3*a* to 6*a* are provided in the cable housing. The winding direction of the flat cables is reversed at the reversing portions 3*a* to 6*a*, and then the flat cables 3 to 6 are wound in the reverse direction (i.e., clockwise in FIG. 1) along the inner cylindrical portion 22 in a spiral manner after the reverse.

The reversing portions 3*a* to 6*a* are provided in the cable housing 2 in a circumferential direction with almost same spacing. The reversing portions 3*a* to 6*a* move with almost same spacing in the same direction as the rotary direction of the inner case 21, as the inner case 21 rotates. For example, in case that the inner case 21 as shown in FIG. 1 is rotated in clockwise, the flat cables 3 to 6 wound along the outer cylindrical portion 12 come to be wound along the inner cylindrical portion 22, so that the reversing portions 3*a* to 6*a* move in clockwise accordingly.

The reversing portions 3*a* to 6*a* have to be maintained at the prescribed positions in the flat cables 3 to 6 until the rotary connector 1 is attached to the vehicle body. Since the length of the respective flat cables 3 to 6 received in the cable housing 2 is limited, the number of rotation of the inner case 21 is limited. Accordingly, it is designed that the respective positions of the reversing portions 3*a* to 6*a* until the attachment to the vehicle body are to be placed as the center position of the flat cable (hereinafter referred to as neutral positions), and after the rotary connector 1 is attached to the vehicle body, the inner case can be rotated same number of times in both of clockwise and counterclockwise.

As described above, the reversing portions 3*a* to 6*a* are maintained at the neutral positions until the rotary connector 1 is attached to the vehicle body, thus a fixture 14 is attached between the outer case 11 and the inner case 21. The fixture 15 provisionally fixes the inner case 21 to the outer case 11 so that the inner case 21 does not rotate.

In addition, a sighting window 25 is provided in the upper lid portion 23 of the inner case 21, through which any one of the reversing portions 3a to 6a can be sighted, when it exists in that position. When the reversing positions 3a to 6a are placed in the neutral positions, it is designed that any one of the reversing positions 3a to 6a (in this embodiment, the reversing position 3a) comes to the position in the sighting window 25.

In the embodiment as shown in FIG. 1, a gazing mark 7 and an arrowhead 8 are provided in the vicinity of the sighting window 25. The gazing mark 7 encourages the user to gaze the sighting window 25, for example, a high recognition mark may be used, which is a yellow-colored triangle with an exclamation mark added in the center thereof as an attention calling. Furthermore, a mark to show the neutral position is added to the reversing portion 3a of the flat cable 3, so that the inner case can be precisely positioned at the neutral position by matching the mark 7 with the arrowhead 8. Thus, an alignment mark 52, 53 described later is not necessarily provided.

In this embodiment, it is designed that any one of the reversing portions of the flat cables 3 to 6 (in this case, the reversing portion 3a) comes to the position of the sighting window 25, when the inner case 21 is in the neutral position. Furthermore, a prescribed mark is added to the reversing portion 3a which comes to the position of the sighting window 25 when the inner case 21 is in the neutral position. Accordingly, it can be determined that the inner case 21 is in the neutral position, in case that the prescribed mark is added to the reversing portion sighted through the sighting window 25.

Figure 2:
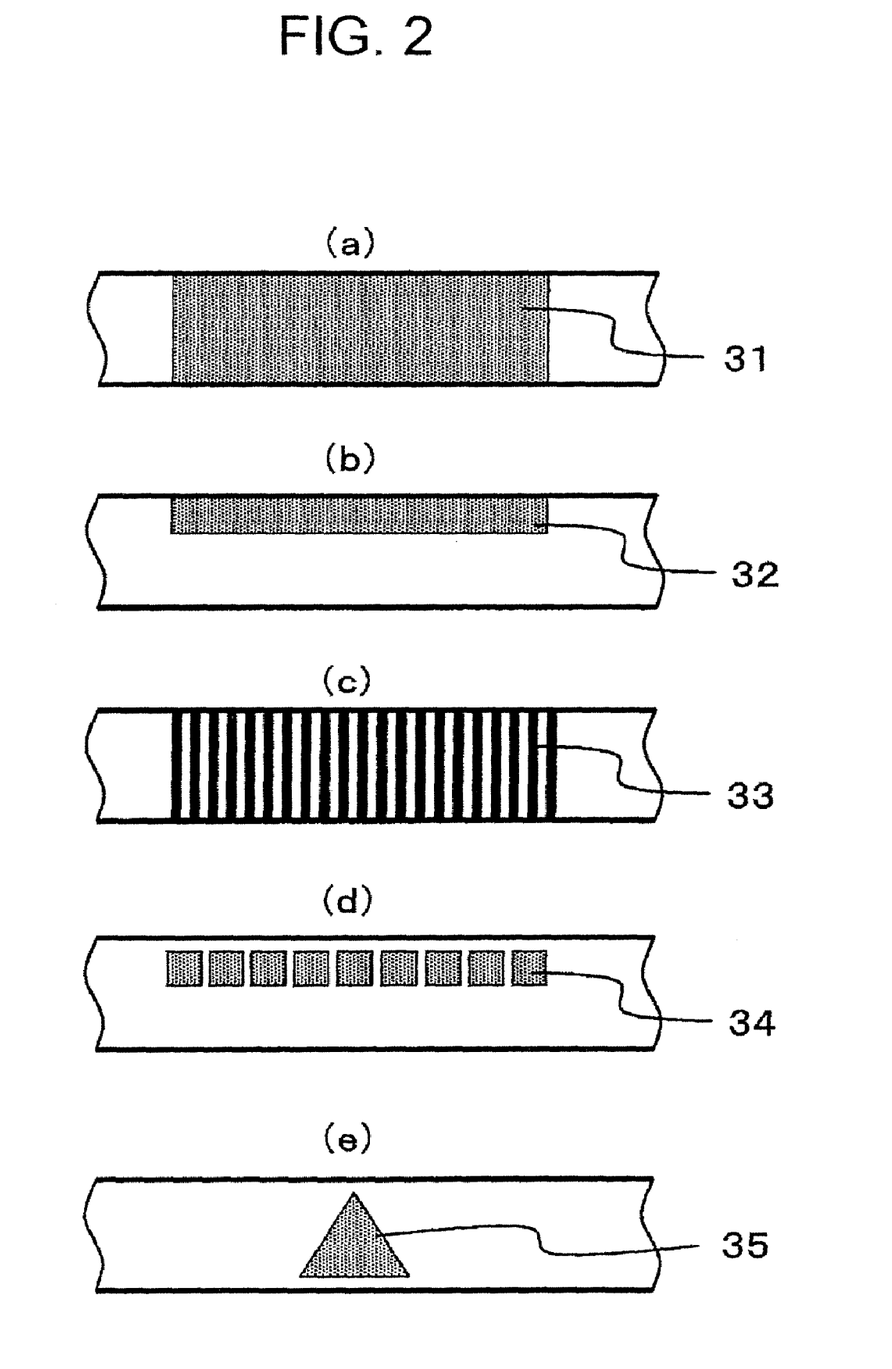

Examples of the prescribed mark are shown in FIG. 2. Five kind of examples of the prescribed mark are shown in FIG. 2. In the mark 31 as shown in FIG. 2(a), the flat cable 3, 4, 5, 6 is colored across an entire width over a prescribed length thereof. The prescribed length of the flat cable 3, 4, 5, 6 is preferably the range of length which can be sighted through the sighting window 25, when the inner case 21 is in the neutral position.

In the mark 32 as shown in FIG. 2(b), the flat cable 3, 4, 5, 6 is colored on a portion of the width over a prescribed length thereof. Which mark 31 in FIG. 2(a) or mark 32 in FIG. 2(b) is selected considering a clear sighting or the like.

While the flat cable is colored over a prescribed entire length in the mark 31 in FIG. 2(a) and the mark 32 in FIG. 2(b), the flat cable is colored in a manner of parallel lines of the prescribed width with the same intervals therebetween in the mark 33 in FIG. 2(c) and the mark 34 in FIG. 2(d). The mark 33, 34 thus provided functions as a scale so that the inner case 21 can be more precisely matched to be in the neutral position.

The mark 35 as shown in FIG. 2(e) is designed as a triangle mark which is used to align with a prescribed one point. For example, it is designed that the prescribed one point is provided at a certain position in the sighting window 25, and the prescribed one point matches with the apex of the triangle mark as shown in FIG. 2(e), when the inner case 21 is in the neutral position.

Figure 3:
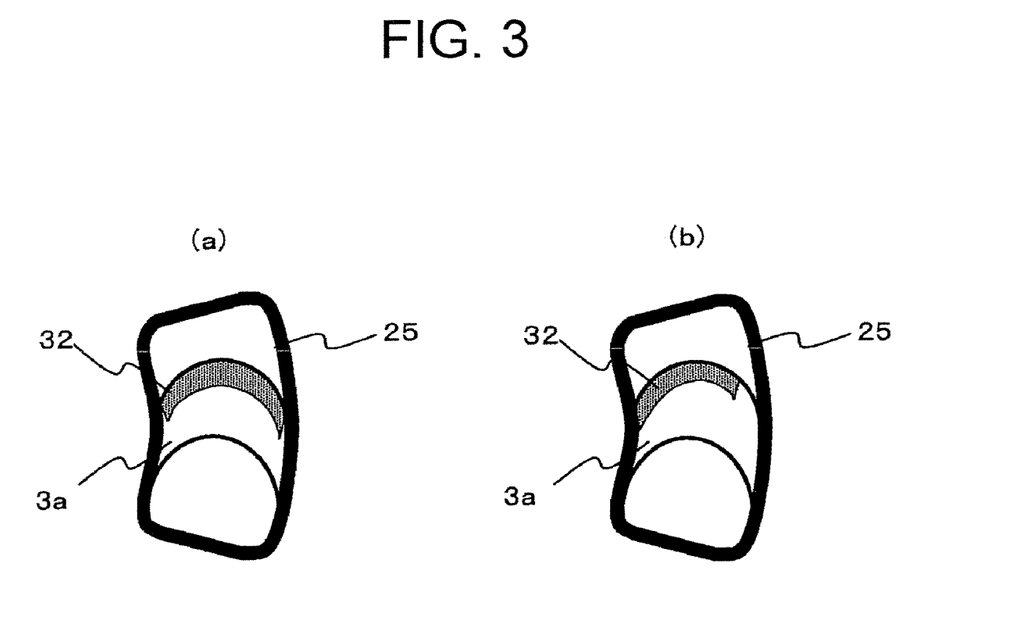
FIG. 3 shows the state of the prescribed marks sighted through the sighting window, FIG. 3(*a*) shows the visual state of the mark when the inner case is in the neutral state, and FIG. 3(*b*) shows the visual state of the mark when the inner case is a little apart from the neutral state.

FIG. 3 shows a visual view sighted through the sighting window 25 when the mark 32 as shown in FIG. 2(b) is used as the prescribed mark. More specifically, FIG. 3 shows a view of the reversing portion 3a of the flat cable 3 sighted through the sighting window 25 toward an oblique front. FIG. 3(a) shows a visual view when the inner case 21 is in the neutral position, and FIG. 3(b) shows a visual view when the inner case 21 is in a little apart of the neutral position.

As shown in FIG. 3(a), the mark 32 is formed in such manner that the entirety of the mark 32 can be visually sighted through the sighting window 25 when the inner case 21 is in the neutral position. Furthermore, when the inner case 21 is in a little apart from the neutral position, the mark 32 accordingly comes to the position apart from the sighting window 25, as shown in FIG. 3(b).

With reference to FIG. 3, the example as the prescribed mark using the mark 32 as shown in FIG. 2(b) is described above. The neutral condition of the inner case 21 in case that the mark 31, 33, 34, 35 is used can be determined in the same manner as described above. When the mark 31, 32, 33, 34, 35 is attached to any one of the flat cables 3 to 6, it is possible to set the inner case 21 to be in the neutral position in spite of the number of the flat cables.

As described above, according to the rotary connector 1 of this embodiment of the invention, it is possible to set the inner case 21 to be in the neutral position only by sighting through the sighting window 25 one of the marks 31 to 35 attached to the flat cables.

Figure 4:
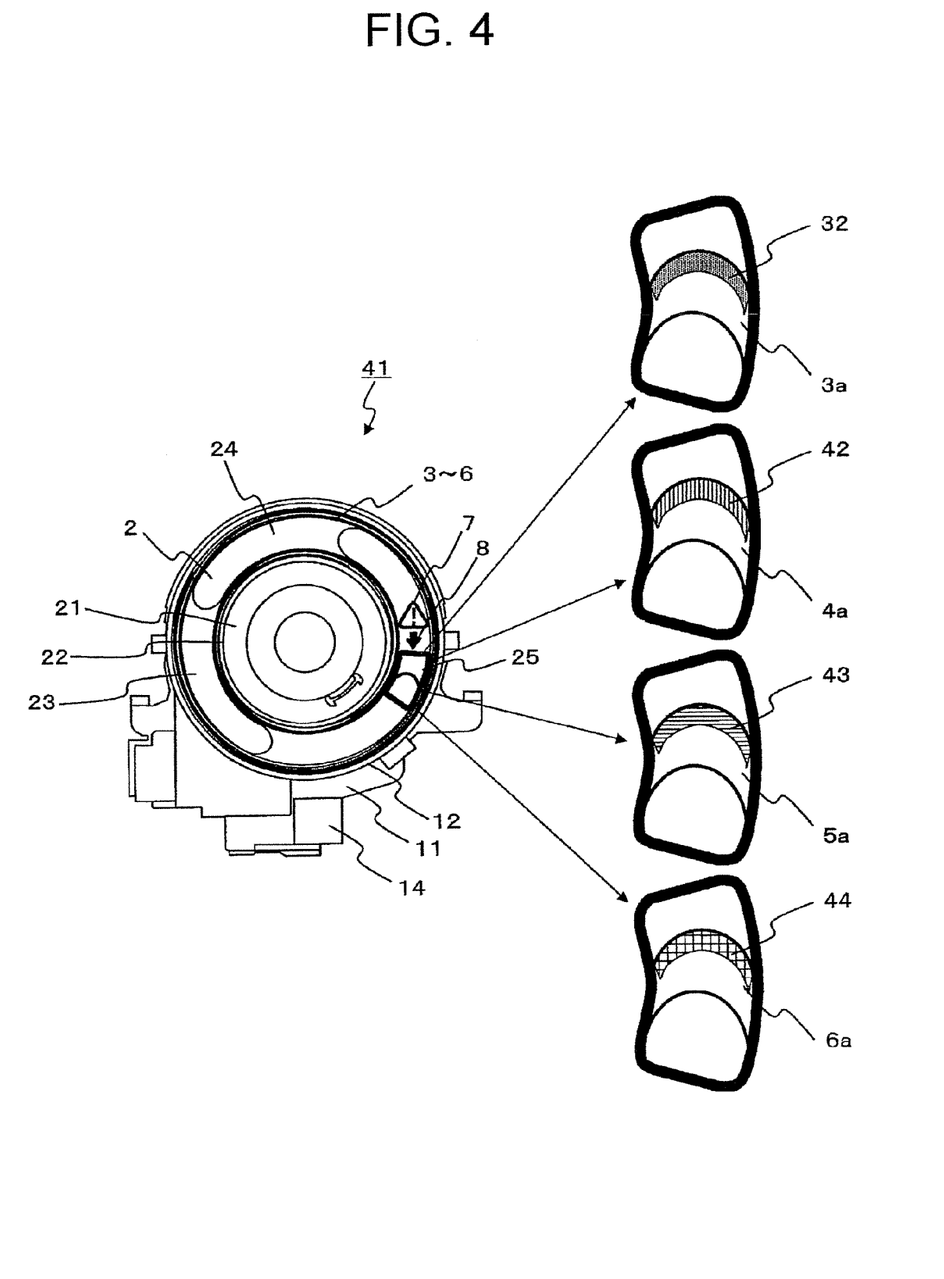
FIG. 4 is a plan view showing a schematic constituent of the second embodiment of the rotary connector of the invention.

The second embodiment of the rotary connector of the invention is described with reference to FIG. 4. In the rotary connector 41 of this embodiment, the reversing portion 3a with the prescribed mark attached can be sighted through the sighting window 25 when the inner case 21 is in the neutral position, as the same as the previous embodiment.

On the other hand, a different mark 42, 43, 44 is attached to the reversing portion 4a, 5a, 6a when the inner case 21 is not in the neutral position in this embodiment, whereas no mark is attached to the reversing portion 4a, 5a, 6a in the previous embodiment.

The mark having the same configuration as the prescribed mark and different color can be used as the different mark 42, 43, 44. In this case, a high recognition color is used in the prescribed mark. More specifically, a lower recognition color is used to the different mark depending on the degree that the inner case 21 is farther apart from the neutral position when the different mark is sighted through the sighting window 25. It is thus possible to determine the degree of the deviation of the inner case 21 from the neutral position by the color of the mark sighted through the sighting window 25 when the color is thus selected.

Figure 5:
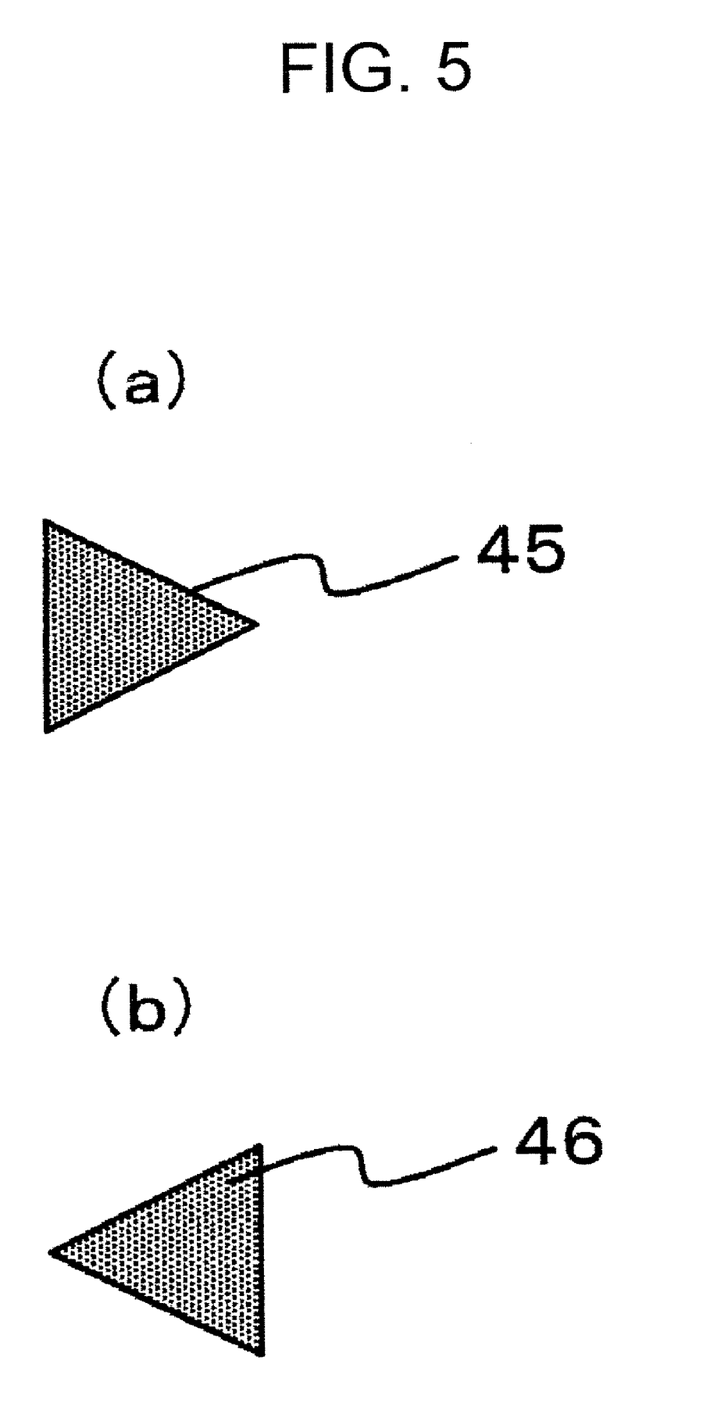
FIG. 5 shows examples of the mark sighted when the inner case is not in the neutral state.

Marks 45, 46 having configurations as shown in FIG. 5 may be used as other examples of the different mark. More specifically, the mark 45 as shown in FIG. 5(a) is attached to the reversing portion 4a which is sighted through the sighting window 25 at the time when the inner case 21 rotates counterclockwise from the neutral position so that it is informed that the inner case 21 can be returned to the neutral position when the inner case 21 is rotated clockwise.

In the similar manner, the mark 46 as shown in FIG. 5(b) is attached to the reversing portion 6a which is sighted through the sighting window 25 at the time when the inner case 21 rotates clockwise from the neutral position so that it is informed that the inner case 21 can be returned to the neutral position when the inner case 21 is rotated counterclockwise.

Figure 6:
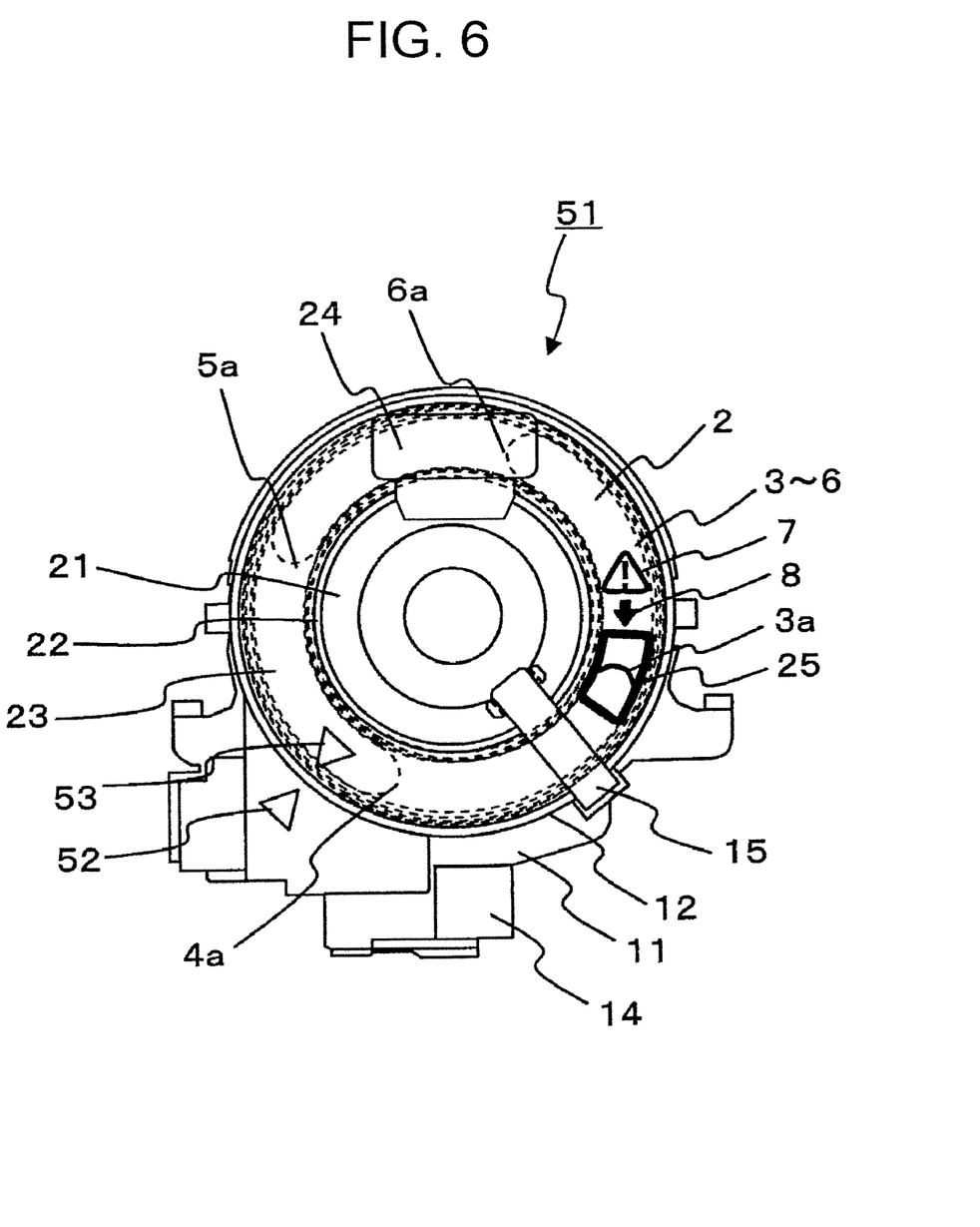
FIG. 6 is a plan view showing a schematic constituent of the third embodiment of the rotary connector of the invention.

The rotary connector of the third embodiment of the invention is described with reference to FIG. 6. In the rotary connector 51 of this embodiment, a pair of alignment marks 52, 53 as shown in FIG. 6 are additionally used in order to more precisely align the inner case at the neutral position. According to this embodiment, the inner case 21 can be brought in the neutral position only by sighting the reversing portion 3a with the prescribed mark attached thereto through the sighting window 25, furthermore, the inner case 21 can be more precisely aligned with the neutral position further by matching the alignment marks 52, 53.

As described above, according to one of the embodiments of the invention, it is possible to provide the rotary connector in which the neutral position of the inner case can be easily recognized in spite of the number of the flat cables received in the cable housing.

In addition, according to one of the embodiments of the invention, since the inner case can be set to be in the neutral position only by sighting through the sighting window the prescribed mark attached to the flat cable, the inner case can be quickly returned to the neutral position, thus improving workability.

Furthermore, in case that at least two flat cables are received in the cable housing, since the different mark is attached to the reversing portion of the respective flat cables, it is possible to determine the degree of the deviation of the inner case from the neutral position, thus the inner case can be quickly returned to the neutral position.

The embodiments of the present invention show examples of the rotary connector of the invention, and the present invention is not limited to the above embodiments. The detail structure and operation of the rotary connector of the above embodiments can be modified without deviating from the scope of the invention.

What is claimed is:

1. A rotary connector, comprising:
    an outer case including a bottom portion and an outer cylindrical portion;
    an inner case including an upper lid portion and an inner cylindrical portion, installed within said outer case in a relatively rotatable manner to said outer case;
    at least one flat cable received in a cable housing formed by said outer case and said inner case;
    a fixed connecting portion provided in said outer case, to which one end of the at least one flat cable is connected;
    a rotary connecting portion provided in said inner case, to which an other end of the at least one flat cable is connected;
    a reversing portion provided in the cable housing for reversing a winding direction of the at least one flat cable from a state of being wound along an inner wall of said outer cylindrical portion in one direction with one end of said at least one flat cable connected to said fixed connecting portion, to a state of being wound along an outer wall of said inner cylindrical portion with the other end of said at least one flat cable connected to said rotary connecting portion;
    a prescribed mark attached to a portion of a first flat cable corresponding to the reversing portion when the inner case is in a neutral state, in which a number of clockwise rotations of the inner case is equal to a number of counterclockwise rotations of the inner case; and
    a sighting window arranged in the upper lid portion of said inner case for sighting the prescribed mark in the neutral-state,
    wherein at least the first flat cable and a second flat cable are received in the cable housing, and the prescribed mark is attached to the portion of the first flat cable corresponding to the reversing portion sighted through the sighting window when the inner case is in the neutral state, and a different mark from the prescribed mark is attached to a portion of the second flat cable corresponding to the reversing portion sighted through the sighting window when the inner case is not in the neutral state.

2. The rotary connector according to claim 1, wherein the different mark is formed by a different configuration or colored by a different color in respective portions of the second flat cable corresponding to the reversing portions sighted through the sighting window.

3. The rotary connector according to claim 1, wherein the prescribed mark is formed to be a configuration corresponding to a window frame of the sighting window when the inner case is in the neutral state.

4. The rotary connector according to claim 3, wherein the prescribed mark is colored by a high recognition color such as red or yellow.

5. The rotary connector according to claim 1 or 3, wherein the prescribed mark is formed to be a configuration corresponding to a prescribed location in the sighting window when the inner case is in the neutral state.

* * * * *